(12) United States Patent
Wu et al.

(10) Patent No.: US 8,112,106 B2
(45) Date of Patent: Feb. 7, 2012

(54) METHOD AND APPARATUS FOR OBTAINING GROUP INFORMATION BY AN INVITED USER DURING A SESSION

(75) Inventors: Xugang Wu, Shenzhen (CN); Zheng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 583 days.

(21) Appl. No.: 12/008,989

(22) Filed: Jan. 15, 2008

(65) Prior Publication Data

US 2008/0274762 A1 Nov. 6, 2008

Related U.S. Application Data

(63) Continuation of application No. PCT/CN2006/001586, filed on Jul. 6, 2006.

(30) Foreign Application Priority Data

Jul. 15, 2005 (CN) .......................... 2005 1 0083976
Dec. 2, 2005 (CN) .......................... 2005 1 0126632

(51) Int. Cl.
*H04B 7/00* (2006.01)
(52) U.S. Cl. .......................... 455/518; 455/519; 709/227
(58) Field of Classification Search .......... 455/518–521; 709/227–228
See application file for complete search history.

(56) References Cited

U.S. PATENT DOCUMENTS

| | | | |
|---|---|---|---|
| 2003/0119540 A1 | 6/2003 | Mathis | |
| 2003/0153340 A1 | 8/2003 | Crockett et al. | |
| 2003/0153342 A1 | 8/2003 | Crockett et al. | |
| 2004/0093433 A1 | 5/2004 | Armbruster et al. | |
| 2005/0054361 A1* | 3/2005 | Turcanu et al. | 455/518 |
| 2005/0228895 A1* | 10/2005 | Karunamurthy et al. | 709/229 |
| 2006/0114882 A1* | 6/2006 | Mills | 370/352 |
| 2006/0270362 A1* | 11/2006 | Emrich et al. | 455/90.2 |
| 2008/0248826 A1* | 10/2008 | Holm | 455/518 |

FOREIGN PATENT DOCUMENTS

CN 1602081 A 3/2005
(Continued)

OTHER PUBLICATIONS

Translation of the Written Opinion of the International Searching Authority in respect of counterpart PCT Application No. CN2006/001586.

(Continued)

*Primary Examiner* — Raymond Dean
(74) *Attorney, Agent, or Firm* — Slater & Matsil, L.L.P.

(57) ABSTRACT

The present invention relates to a method for obtaining group information by an invited user in a Push-to-Talk over Cellular (PoC) session. The method comprises: sending, by a PoC client where a user initiating the session is located, a session request message carrying information about the user initiating the session and the session group member information to a PoC server; and sending, by the PoC server, the session request message carrying the information about the user initiating the session to a PoC client where the invited user is located. The PoC server sends session group member information to the PoC client where the invited user is located, so that the invited user is able to know the session group member, or refer to the session group member information to determine subsequent operations. The present invention has also disclosed a PoC system.

10 Claims, 9 Drawing Sheets

FOREIGN PATENT DOCUMENTS

| WO | 00/30375 | 5/2000 |
| WO | 02/089408 A1 | 11/2002 |
| WO | 2005/084067 | 9/2005 |

OTHER PUBLICATIONS

Espacent English abstract of CN 1602081 A.

Push-toTalk over cellular Architecture, Draft Version 2.0, Jun. 16, 2005, Open Mobile Alliance, 276 pages.
Push-toTalk over Cellular Architecture, Draft Version 2.0, Jun. 15, 2005, Open Mobile Alliance, 13 pages.
Communicaton pursuant to Article 94(3) EPC, Application No. 06 753 111.1—2412, dated Sep. 8, 2011, 6 pages.

* cited by examiner

METHOD AND APPARATUS FOR OBTAINING GROUP INFORMATION BY AN INVITED USER DURING A SESSION

The present application is a continuation of PCT application PCT/CN2006/001586, filed on Jul. 6, 2006, entitled "A METHOD AND APPARATUS FOR OBTAINING GROUP INFORMATION BY THE INVITED USER DURING THE SESSION", which is incorporated by reference herein in its entirety.

FIELD OF THE INVENTION

The present invention relates to a Push-to-Talk over Cellular (PoC) session technology in the technical field of communications, particularly to a method and apparatus for obtaining group information by an invited user during a PoC session.

BACKGROUND OF THE INVENTION

Users of the PoC service may initiate a 1-1 (one-to-one), 1-M (one-to-more) or 1-M-1 (one-to-more-to-one) session through a PoC mobile phone. In the 1-M or 1-M-1 mode, multiple users participate in the session. When initiating a session, an initiator may adopt an Ad hoc (temporary) mode, or a Pre-arranged (predefined) mode. In the Ad hoc mode, the initiator temporarily selects a participant from a contact person list to initiate a group session; and in the Pre-arranged mode, group information is defined before a user initiates a session, and the initiator initiates a group session only with a group identification.

A user may be invited in two scenes as follows: firstly, a participant is designated when a session is established and in this case, either the Ad hoc mode or the Pre-arranged mode may be adopted; secondly, a session participant invites a user to join in the way of adding a participant during the session.

The existing PoC session includes a sender end signal procedure and a receiver end signal procedure. In those two procedures, an invitation information is described with a SIP invite request or a SIP re-invite request. A session request message that is sent to a PoC server by a PoC session initiating end contains session participant information and initiator information. A session request message that is sent to an invited user by the PoC server contains initiator information, but no session participant information.

According to Open Mobile Alliance (OMA) PoC standards, there exit two kinds of servers in the PoC session, i.e. a participating function server and a controlling function server. The controlling function server is in charge of centralized session control and media distribution. The participating function server cooperates with the controlling function server to control a session and store a user's session configuration. The session configuration includes the user's answer modes—automatic answer mode or manual answer mode, coming call screening and personal instant message screening etc. A calling user may override the use's answer mode if necessary. When the use's answer mode is a specified answer mode—automatic answer mode or manual answer mode, the calling user may put relevant description information into an invitation, so as to reverse the use's answer mode. In other words, the use's manual answer mode may become the automatic answer mode; or the automatic answer mode may become the manual answer mode. The premise for the override operation is that the called user has granted the calling user right to override the use's answer mode. A corresponding authentication will be performed by the participating function server.

In the PoC session, the invited user may decide whether to participate in the session according to the session group member information. Because a exiting session request message sent to the invited user doesn't contain the session group member information, the invited user may not know the group information before participating in an Ad hoc session. When the invited user finds that there is a member whom the invited user is unwilling to communicate with after participating in the session, and then quits, unnecessary cost may be caused.

SUMMARY OF THE INVENTION

The present invention provides a method and apparatus for obtaining group information by an invited user during a session, so as to solve the problem that a user cannot know the group information before participating in an Ad hoc session in the prior art.

The present invention provides the following solution.

A method for obtaining group information by a second PoC client in a Push-to-Talk over Cellular (PoC) session, comprising:
 initiating, by a first PoC client, a PoC session;
 receiving, by a PoC server, a session request message carrying information about the user initiating the session and session group member information from the first PoC client;
 sending, by the PoC server, the session group member information to a second PoC client;
 obtaining, by the second PoC client, the session group member information.

Before the sending the session group member information to the second PoC client, by the PoC server, sending the session request message to the second PoC client, the method further comprises:
 configuring parameters in the second PoC client, indicating whether to obtain the session group member information;
 determining to obtain the session group member according to the parameters, by the second PoC client, after receiving the session request message from the PoC server;
 sending, by the second PoC client, a request message of obtaining the group member information to the PoC server.

The sending the session group member information to the second PoC client, further comprises:
 sending, by the PoC server, the session request message to the second PoC client carrying the session group member information.

A Push-to-Talk over Cellular (PoC) client, comprises: a user side management module, and a control side management module connected with the user side management module;
 the user side management module adapts to process transmission and reception of a voice stream as well as process a request of a right to speak;
 the control management module adapts to manage and control signal;
 the control side management module comprises:
 a session management sub-module, adapted to determine whether to further query group member information when receiving a session request message;
 an information subscription and reception sub-module connected with the session management sub-module, adapted to send a request message of obtaining group member information to a PoC server, when the group member information needs to be queried.

A PoC server comprises: a user side management module, and a control side management module connected with the user side management module, wherein the user side management module adapts to process transmission and reception of a voice stream as well as process a request of a right to speak;

the control side management module adapts to manage and control signal, wherein the control side management module comprises:

a session management sub-module, adapted to process initiation and release of a session as well as participation and quitting of a member in the session, and send session group member information to a PoC client with a session request message;

an information subscription and notification sub-module connected with the session management sub-module, adapted to support information subscription and information notification, and send the session group member information to the PoC client according to a request message of obtaining group member information of the PoC client.

A PoC system comprises a PoC client and a PoC server, the PoC client and the PoC server having a user side management module and a control side management module respectively, wherein the control side management module of the PoC client comprises:

a session management sub-module, adapted to determine whether to further query group member information when receiving a session request message;

an information subscription and reception sub-module connected with the session management sub-module, adapted to send a request message of a group member information to the PoC server, when the group member information needs to be queried;

the control side management module of the PoC server comprises:

a session management sub-module, adapted to process initiation and release of a session as well as participation and quitting of a member in the session, and send session group member information to a PoC client with a session request message;

an information subscription and notification sub-module connected with the session management sub-module, adapted to support information subscription and information notification, and send the session group member information to the PoC client according to a request message of obtaining group member information of the PoC client.

In the present invention, when sending the session request message to the invited user, the PoC server sends the session group member information at the same time, or after sending the session request message, the PoC server sends the session group member information to the invited user according to his/her request. So that before participating in the session, the user may know in time the member who participates in the session, so as to determine whether to participate in the session or not. Thereby, the user experience may be enhanced, and unnecessary cost for the user may be avoided.

DETAILED DESCRIPTION OF THE EMBODIMENTS

To enable an invited user to obtain session group member information before participating in the session in the PoC Ad hoc session, the session group member information is sent by a PoC server to a PoC client where the invited user is located, so that the invited user may obtain the member information in the session. Consequently, the invited user may decide whether to perform subsequent operations such as joining in the session by referring to the obtained member information.

Figure 1:
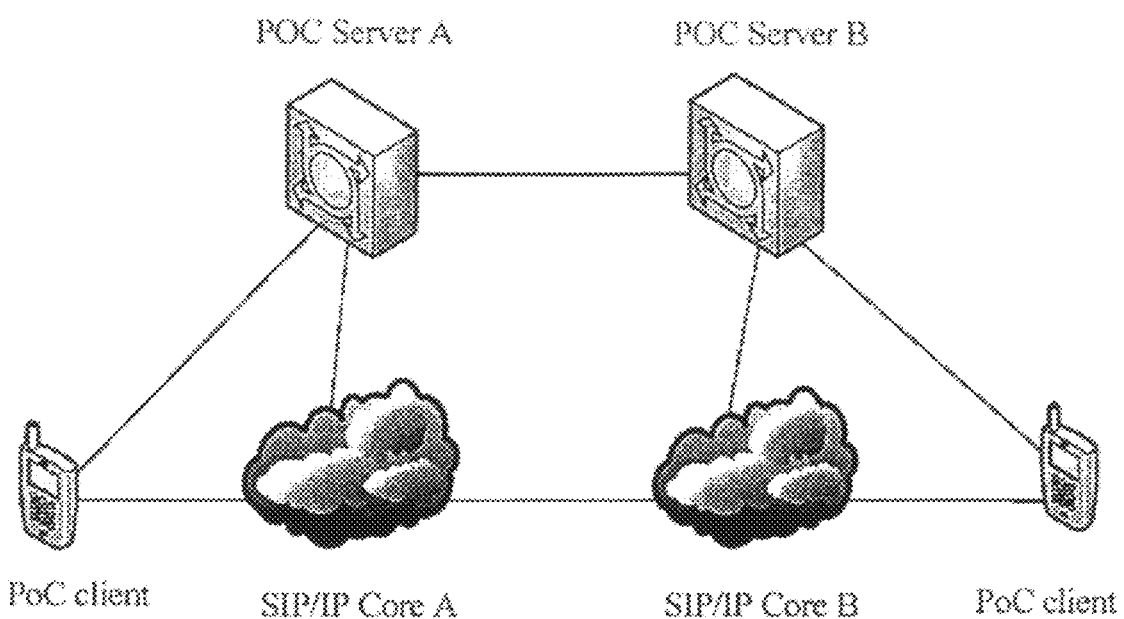
FIG. 1 is a schematic diagram showing the architecture of a PoC system according to an embodiment of the present invention.

As shown in FIG. 1, the PoC system includes a plurality of PoC clients and a PoC server for controlling the PoC clients to accomplish sessions. The PoC clients, PoC servers and SIP/IP Cores may be connected with each other through a network. There may exist a plurality of PoC servers.

Figure 2A:
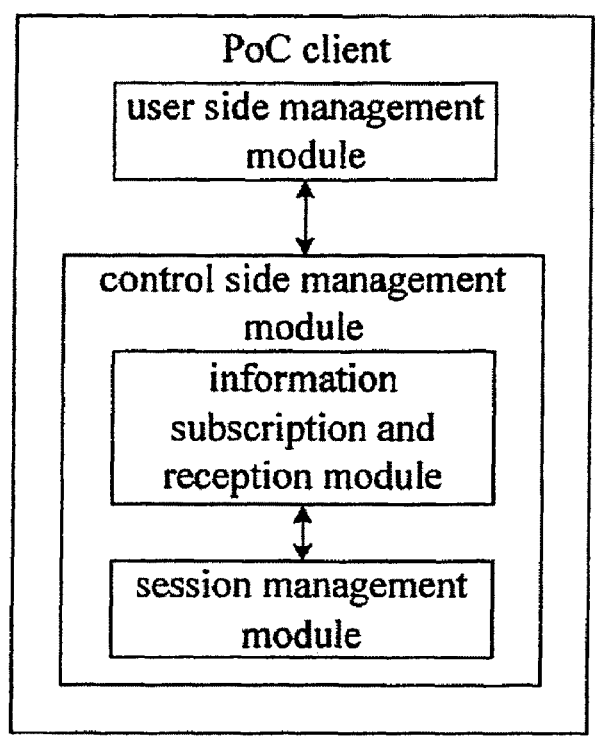
FIG. 2A is a schematic diagram showing the architecture of a PoC client according to an embodiment of the present invention.

As shown in FIG. 2, the PoC client includes a user side management module and a control side management module.

The user side management module is adapted to process the transmission and reception of a voice stream as well as a request the right to speak.

The control side management module is adapted to perform the signal-relevant management and control.

The control side management module includes an information subscription and reception sub-module and a session management sub-module.

The session management sub-module is adapted to process initiation and release of a session as well as participation and quitting of a member during the session, and determine whether to further query group member information when receiving a session request message.

The information subscription and reception sub-module is connected with the session management sub-module, and is adapted to support information subscription and information notification, and send a request message of obtaining group member information to the PoC server so as to obtain group member information when the user needs the group member information.

Figure 2B:
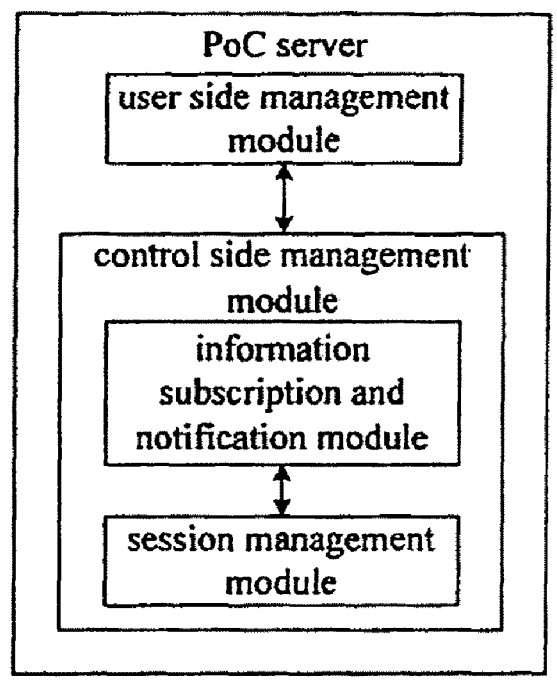
FIG. 2B is a schematic diagram showing the architecture of a PoC server according to an embodiment of the present invention.

As shown in FIG. 2B, a PoC server includes a user side management module and a control side management module.

The user side management module is adapted to process the transmission and reception of a voice stream, a request and an arbitration of the right to speak.

The control side management module is used for signal-relevant management and control.

The control side management module includes two sub-modules:

a session management sub-module is adapted to process initiation and release of the session as well as participation and quitting of a member during the session, and transmit the session group member information to the PoC client via the session request message;

an information subscription and notification sub-module is connected with the session management sub-module, and is adapted to support information subscription and information notification, respond to a request message of obtaining the group member information from the PoC client and send the group member information to the PoC client.

For the PoC Ad hoc session mode, the session request message may be sent by the PoC server to an invited client where the invited user is located when initiating a session, or may be sent by the PoC server during the session.

The session group member information may be sent to the PoC client where the invited user is located in the following two ways.

(1) The session management sub-module of the PoC server puts the session group member information into the session request message and then sends the session request message to the PoC client where the invited user is located.

(2) After the PoC client where the invited user is located receives the session request message, the information subscription and reception sub-module sends a request message of obtaining session group member information to the PoC server, and the information subscription and notification sub-module in the PoC server sends the session group member information to the PoC client according to the request message of obtaining session group member information.

In the second way, the PoC client where the invited user is located requests the session group member information by sending a SUBSCRIBE message, and the PoC server sends the group member information to the PoC client with a NOTIFY message.

After the PoC client receives the session request message, the user may manually control the information subscription and reception sub-module on the PoC client to send the SUBSCRIBE message to the PoC server, so as to request the group member information. The user may also set configuration parameters on the PoC client in advance for indicating whether the session group member information needs to be requested. After the PoC client receives the session request message, the session management sub-module determines whether to request the session group member information according to the configuration parameters. If yes, the SUBSCRIBE message is sent by the information subscription and reception sub-module automatically; otherwise, no SUBSCRIBE message will be sent. In this way, frequency of manual operations of a user, such as key-pressing operations, during the session may be reduced.

In some cases, if amount of the group information is very large, the PoC server may put an overriding configuration parameter instruction into the session request message. After the PoC client receives the session request message, if the overriding configuration parameter instruction is detected, the user is required to manually confirm whether the group information should be further transmitted, no matter whether the user has set the configuration parameters for requesting the group member information or not. So it may be avoided transmitting the large amount of information when a user set the configure parameter which indicates automatically requesting the group number information. Accordingly, the occupied network resources are reduced.

Besides the necessary information, the PoC server may also put group description information, such as group type, group size, etc. into the session request message. Therefore, the invited user may determine whether to request the group member information or participate in the session and so on by referring to the group description information. If the group type is a predefined group, the user does not need to request the member information. If the group description information indicates that there are a lot of group members, the user may also not request the member information.

The session group member information may be information that can uniquely identify a user, such as IP address, user nickname, phone number or uniform resource identifier.

Figure 3:
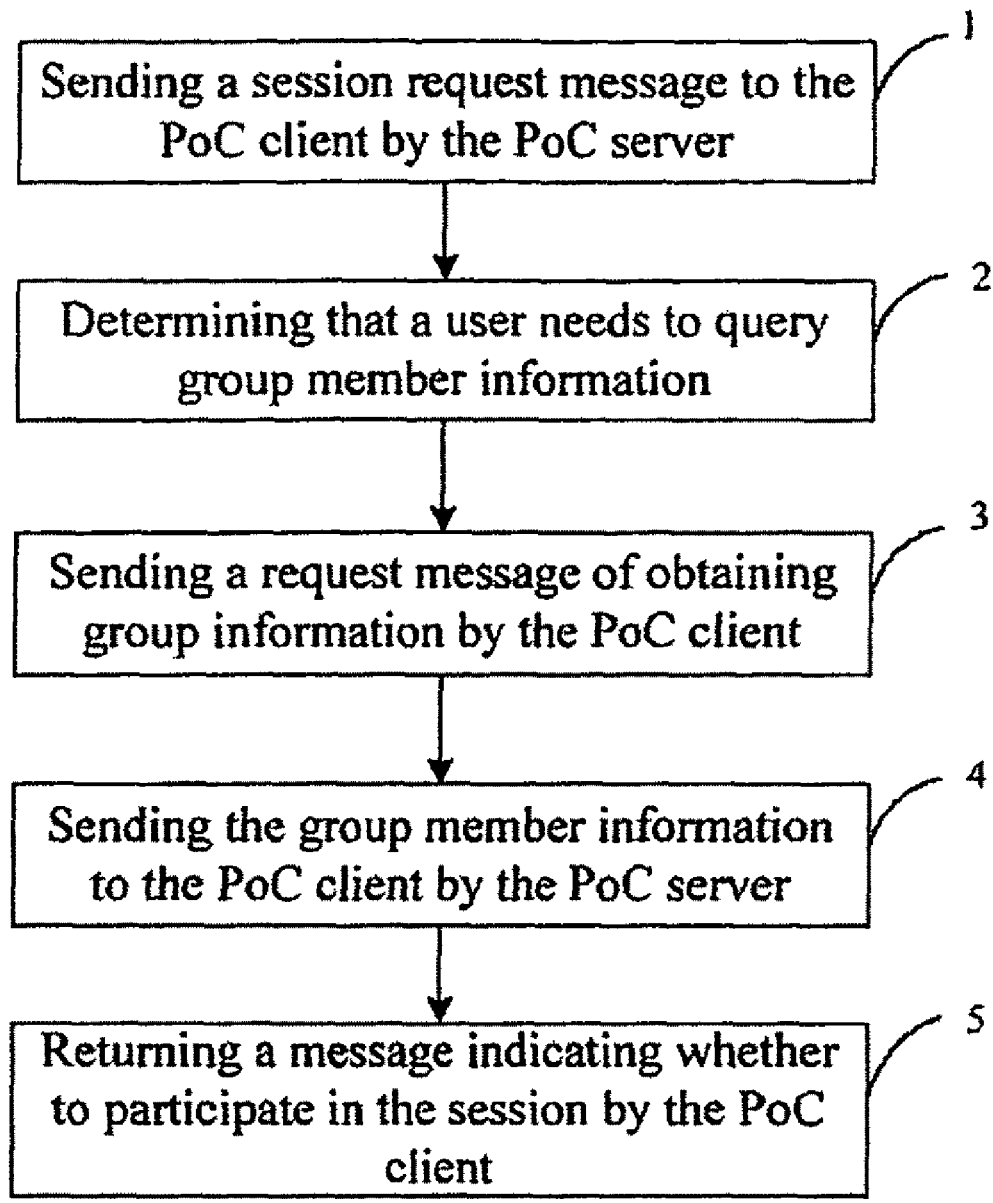
FIG. 3 is a flow chart showing the process of a PoC client requesting member information of a temporary group from a PoC server according to an embodiment of the present invention.

As shown in FIG. 3, the interaction process of requesting the temporary group member information from the PoC server by the PoC client is as follows.

Step 1, the session management sub-module of a PoC server sends a session request message to a PoC client where the invited user is located.

Step 2, after receiving the session request message, the session management sub-module of the PoC client interacts with the user or reads configuration parameter to determine whether it is needed to further query the group information (in the present example, the user needs to query group member information).

Step 3, if the user needs to query the group member information, an information subscription and reception sub-module of the PoC client sends a SUBSCRIBE message of querying the group member information.

Step 4, an information subscription and notification sub-module of the PoC server sends a NOTIFY message carrying the group member information to the PoC client.

Step 5, after the user interacts with the PoC client, the PoC client returns a result of whether the user accepts the session request message to the PoC server via the session management module.

Figure 4:
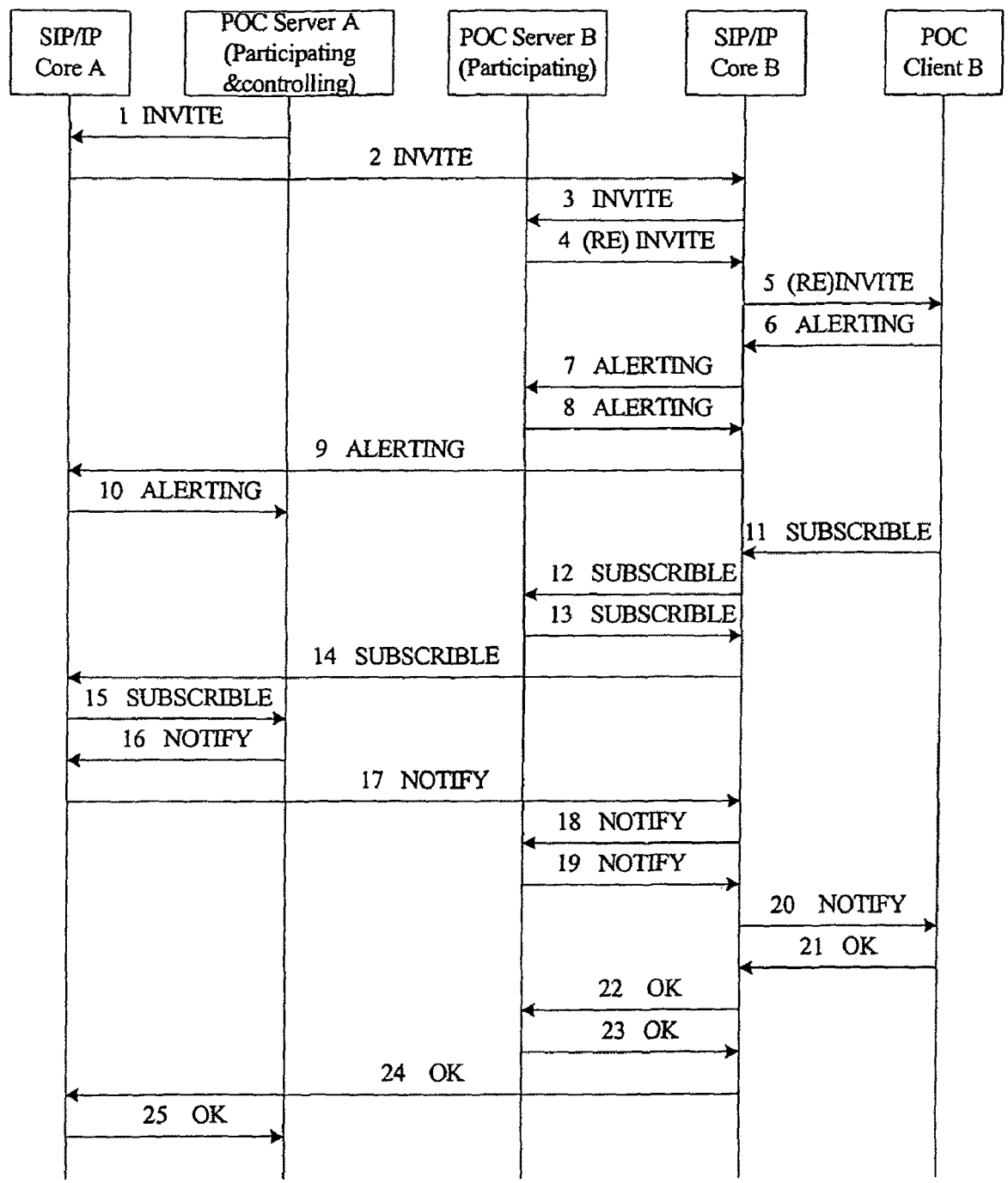
FIG. 4 is a flow chart showing the process of adding a user when initiating a session according to an embodiment of the present invention.

As shown in FIG. 4, when the answer mode of the invited user is the manually answer mode, the process of initiating a session is as follows:

Steps 1-5, a PoC server sends an INVITE message that contains group description information to a PoC client B.

Steps 6-10, the PoC client B responds to the PoC server, so as to generate a ring back tone.

Steps 11-15, the PoC client B sends a request message of obtaining group member information to the PoC server.

Steps 16-20, the invited user sends a SUBSCRIBE message to the server to request the group member information.

Steps 21-25, the invited user B confirms whether to participate in the session to the PoC server.

After step 10, if the user determines not to obtain the group member information, step 21 is performed directly.

Figure 5:
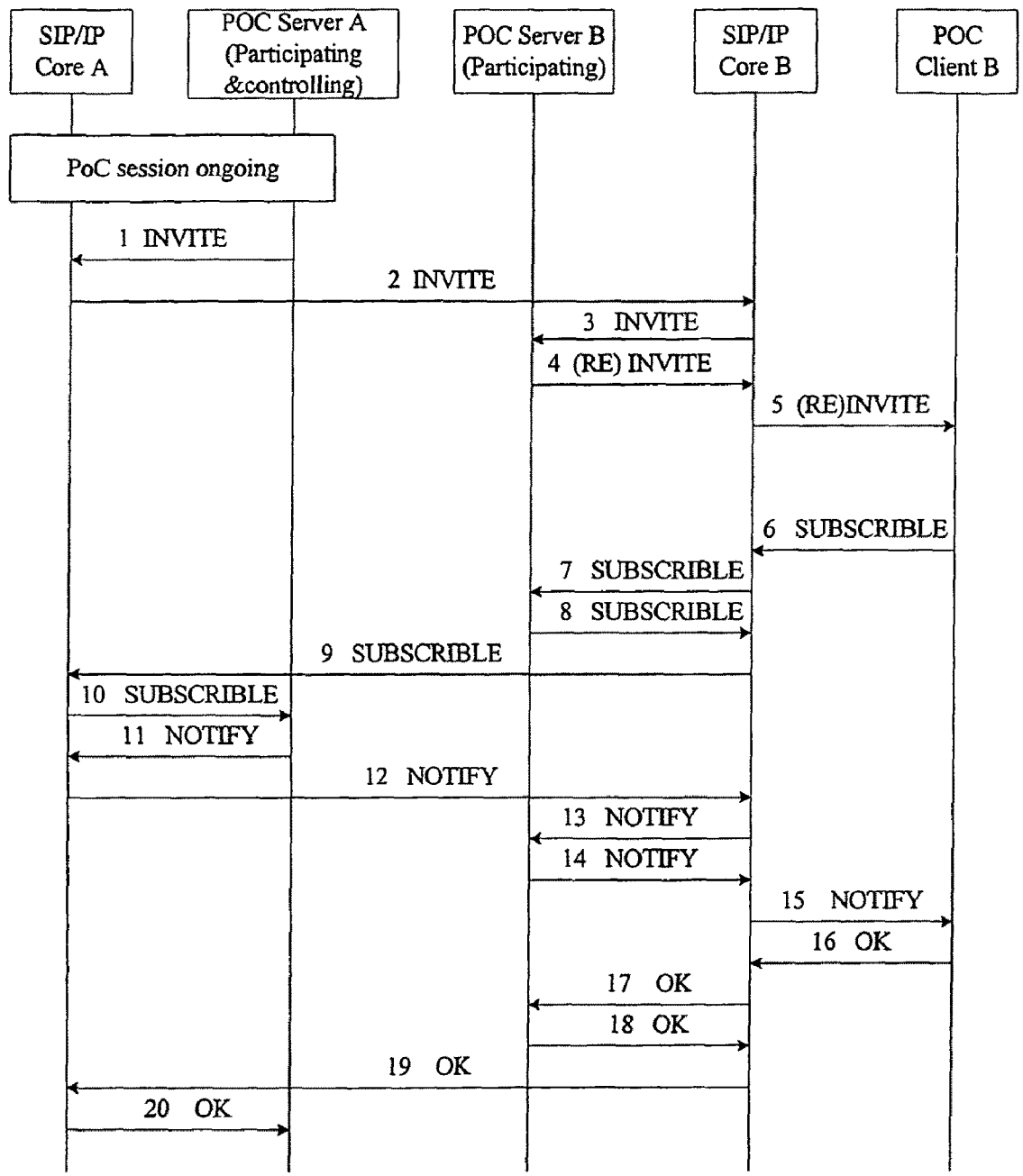
FIG. 5 is a flow chart showing the process of adding a user during the session according to an embodiment of the present invention.

As shown in FIG. 5, when the answer mode of the invited user is the manually answer mode, the process of adding a user during the session is as follows.

Steps 1-5, a PoC server sends an INVITE message containing group member information to a PoC client B.

Steps 6-10, the PoC client B sends a request message of obtaining group member information to the PoC server.

Steps 11-15, the invited user B receives the group member information sent by the PoC server.

Steps 16-20, the invited user B confirms whether to participate in the session to the server.

After step 5, if the user determines not to obtain the group member information, step 16 is performed directly.

In the way of putting the session group member information into the session request message and sending the session request message to the PoC client where the invited user is located, a participating function server where the invited user is located may directly forward the session request message containing the group member information to the PoC client. In a preferred way, it firstly refers to the user's answer mode and supplementary information of the answer mode in the invitation to determine whether to send the group member information to the invited user. If the answer mode of the invited user is the automatically answer mode, and the calling user does not indicate adopting the automatically answer overriding in the invitation, no group member information is sent to the invited user. If the user's answer mode is the manually answer mode, and the calling user indicates adopting manually answer overriding (MAO) in the invitation, and the calling user possesses the right of overriding the manually answer mode, no group member information is sent to the invited user. If the user's answer mode is the manually answer mode, and the calling user does not indicate adopting the manual answer overriding in the invitation, the group member information is sent to the invited user. If the answer mode of the invited user is the automatically answer mode, and the calling user indicates adopting the automatic answer overriding in the invitation, and the calling user possesses the right of overriding the automatically answer mode, the group member information is sent to the invited user.

Figure 6A:
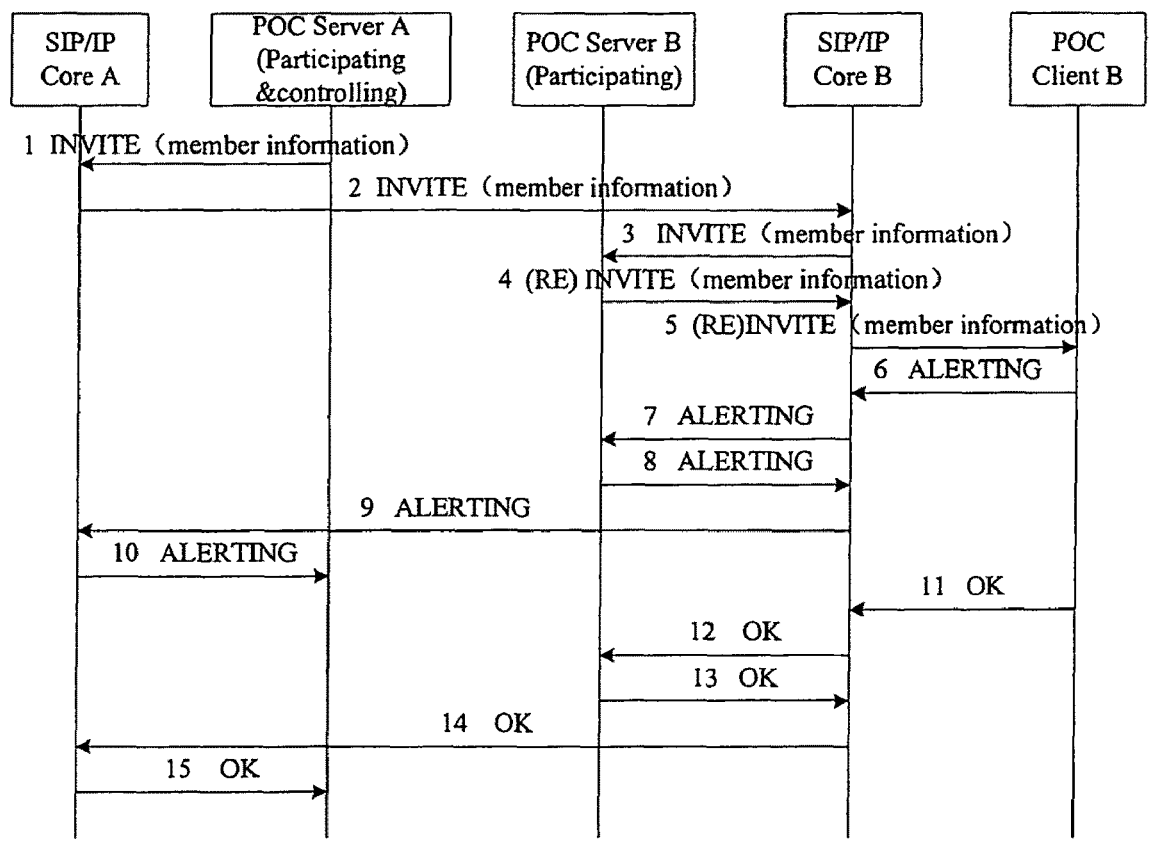
FIG. 6A is a flow chart showing the process of carrying member information in a session request message when initiating a session according to an embodiment of the present invention.

As shown in FIG. 6A, when initiating an Ad hoc mode session, the process of sending the group member information to the PoC client with an INVITE message is as follows.

Steps 1-3, a PoC client A sends an INVITE message carrying group member information to a PoC client B by a POC server, the message is transmitted to a participating function server where the PoC client B is located.

Steps 4-5, the function server where the PoC client B is located determines whether to send the group member information to the invited user according to the user's answer mode and supplementary information of the answer mode in the invitation. (In this embodiment, it is assumed that the calling user does not adopt MAO and the answer mode of the called user B is the manually answer mode, so the member information is sent to the PoC client B).

Steps 6-10, the PoC client B responds to the PoC server, so as to generate a ring back tone.

Steps 11-15, the invited user B confirms whether to participate in the session according to the member information to the server.

Figure 6B:
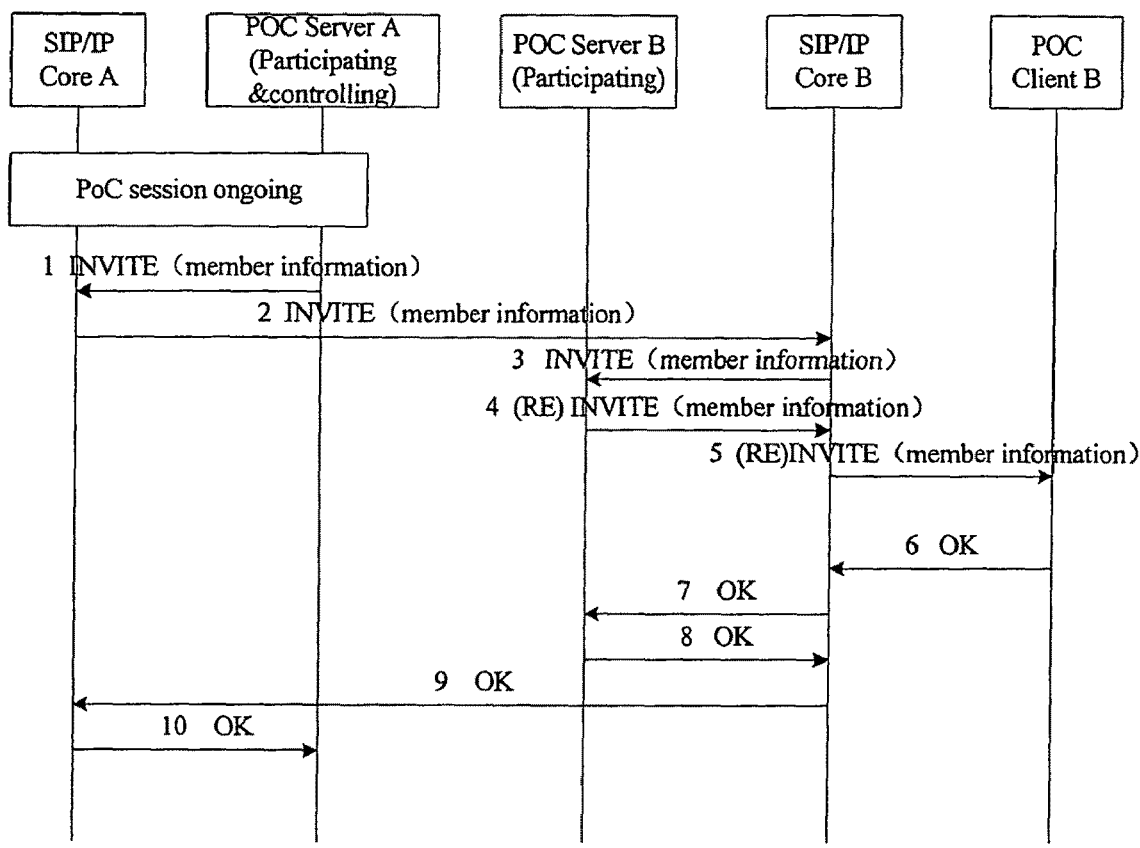
FIG. 6B is a flow chart showing the process of carrying member information in a session request message when adding a user during a session according to an embodiment of the present invention.

As shown in FIG. 6B, during the Ad hoc mode session, the process of adding a user and sending the group member information to the PoC client with an INVITE message is as follows.

Steps 1-5, a PoC server sends an INVITE message carrying group member information to a PoC client B.

Steps 6-10, the invited user B confirms to the server whether to participate in the session according to the member information.

Figure 7:
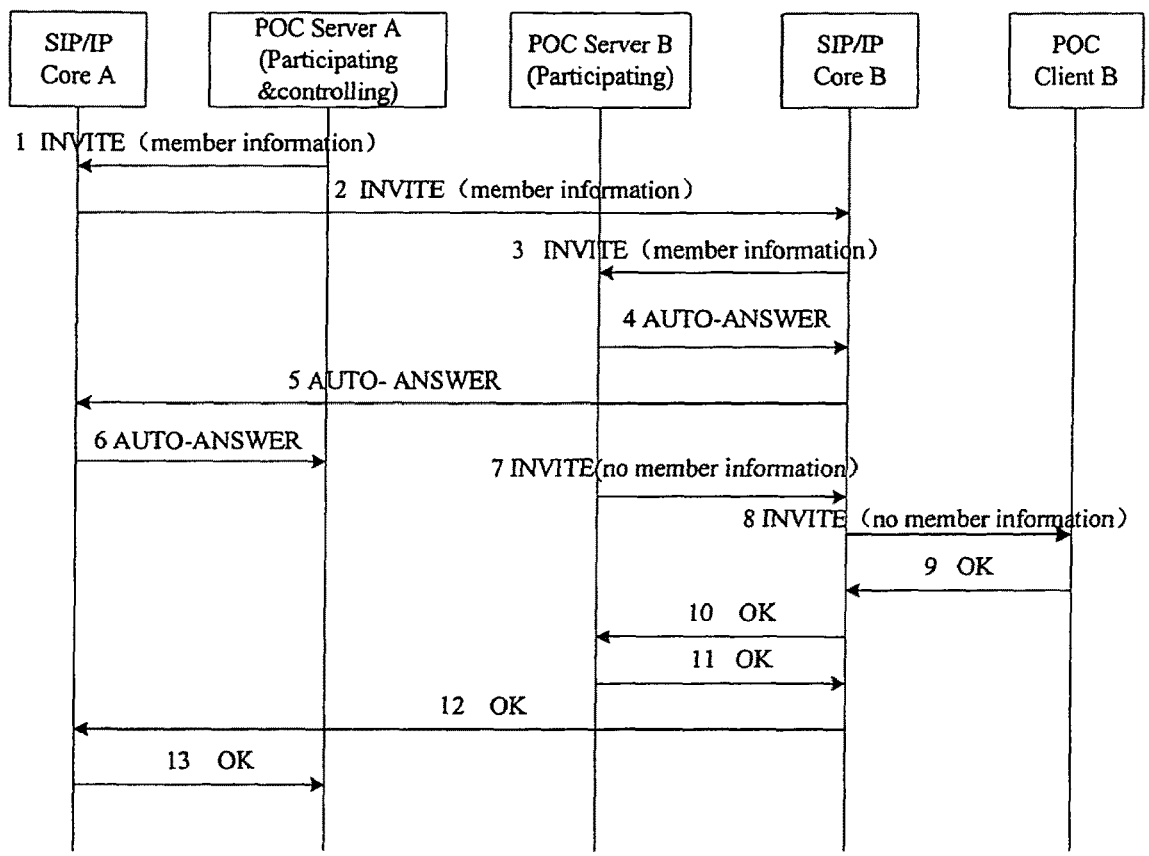
FIG. 7 is a flow chart showing the process of automatic answering a session according to an embodiment of the present invention.

As shown in FIG. 7, when the called user adopts the automatic answer mode, the process of deleting, by the server, the called user's identity information in the request and forwarding the request to the called user is as follows.

Steps 1-3, a PoC server A, namely the controlling function server, sends an INVITE request to a participating function server where the called user is located. After receiving the request, the participating function server where the called user is located determines to answer the session request automatically, if the called user has configured the automatically answer mode and the calling user is in the acceptance list of the called user.

Steps 4-6, the PoC server B answers the session automatically. After receiving the request message, the controlling server notifies the calling user that the called user automatically answers the session. The automatic answer message, namely AUTO-ANSWER, may be a temporary response to the INVITE message.

Steps 7-8, the PoC server B sends a request without the member information to the PoC client B.

Steps 9-10, the PoC client B participates in the session.

Steps 11-13, the PoC server B notifies the PoC server A that the PoC client B has practically participated in the session.

From above, it can be seen that in the present invention, when sending a session request message to an invited user, the PoC server sends the session group member information at the same time. Alternatively, after sending the session request message, the PoC server sends the session group member information to the user who is invited to participate in the session according to the request. Therefore, before participating in the session, the user may know in time the member participating in the session, so as to determine whether to participate in the session. Thereby, the user experience may be enhanced, and an unnecessary cost for the user may be avoided.

Of cause, those skilled in the art will be able to make variations and modifications according to the present invention without departing from the spirit of the present invention. So, if the modifications and variations to the present invention belong to the present claims and are within the scope of equivalent technologies, the present invention is intended to contain these variations and modifications.

What is claimed is:

1. A method for obtaining group information by a second PoC client in a Push-to-Talk over Cellular, PoC, session, comprising:

initiating, by a first PoC client, a PoC Ad hoc session;

receiving, by a PoC server, a session request message carrying information about the first PoC client initiating the Ad hoc session and session group member information from the first PoC client;

sending, by the PoC server, the session request message carrying the session group member information to the second PoC client, wherein the session group member information is at least one of the following: an IP address, a user nickname, a uniform resource identifier or a phone number;

receiving, by a participating function server, the session request message carrying the session group member information;

when determining to send the session group member information to the second PoC client according to an answer mode of the second PoC client and supplementary information of the session request message, sending session request message carrying the session group member information to the second PoC client;

when determining not to send the session group member information to the second PoC client according to the answer mode of the second PoC client and supplementary information of the session request message, deleting the session group member information, then sending the session request message to the second PoC client; and obtaining, by the second PoC client, the session request message.

2. The method according to claim 1, wherein before the process of sending, by the PoC server, the session group member information to the second PoC client, the session request message is sent to the second PoC client; the method further comprising:
configuring parameters in the second PoC client, indicating whether to obtain the session group member information;
determining by the second PoC client, to obtain the session group member according to the parameters, after receiving the session request message from the PoC server; and
sending, by the second PoC client, a request message of obtaining the group member information to the PoC server.

3. The method according to claim 1, wherein before the process of sending, by the PoC server, the session group member information to the second PoC client, the method further comprising:
sending the session request message to the second PoC client, wherein the session request message carries an indication of overriding configuration parameters; and
detecting the indication by the second PoC client, then compelling a user of the second PoC client to determine in a manual mode whether to obtain the session group member information.

4. The method according to claim 3, wherein before the process of sending, by the PoC server, the session group member information to the second PoC client, the session request message is sent to the second PoC client; the method further comprising:
receiving, by the second PoC client, the session request message; and
sending, by the second PoC client, a request message of obtaining the session group member information to the PoC server.

5. The method according to claim 1, further comprising:
when the answer mode of the second PoC client is an automatically answer mode, and the session request message does not indicate adopting an automatically answer overriding, the participating function server determining not to send the session group member information to the second PoC client; or
when the answer mode of the second PoC client is a manually answer mode, and the session request message indicates adopting a manually answer overriding and possesses a right of the manually answer overriding, the participating function server determining not to send the session group member information to the second PoC client; or
when the answer mode of the second PoC client is the manually answer mode, and the session request message does not indicate adopting the manually answer overriding, the participating function server determining to send the session group member information to the second PoC client; or
when the answer mode of the second PoC client is the automatically answer mode, and the session request message indicates adopting the automatically answer overriding and possesses the right of the automatically answer overriding, the participating function server determining to send the session group member information to the second PoC client.

6. The method according to claim 1,
wherein the session request message sent to the second PoC client by the PoC server comprises group description information; and
the method further comprises:
determining, by the second PoC client, by referring to the group description information whether to send a request message of obtaining session group member information to the PoC server.

7. The method according to claim 6, wherein the group description information comprises group type information and/or group size information.

8. A PoC server, comprising: a user side hardware management module, and a control side hardware management module connected with the user side hardware management module, wherein
the user side hardware management module adapts to process transmission and reception of a voice stream as well as process a request of a right to speak;
the control side hardware management module adapts to manage and control signal, wherein the control side management module comprises:
a session management sub-module, adapted to process initiation and release of a session as well as participation and quitting of a member in the session, and send session group member information to a second PoC client with an Ad hoc session request message, wherein the session group member information is at least one of the following: an IP address, a user nickname, a uniform resource identifier or a phone number; and
an information subscription and notification sub-module connected with the session management sub-module, adapted to support information subscription and information notification, and when determining to send the session group member information to the second PoC client according to an answer mode of the second PoC client and supplementary information of the session request message, send the session group member information to the second PoC client; and when determining not to send the session group member information to the second PoC client according to the answer mode of the second PoC client and supplementary information of the session request message, delete the session group member information, then send the session request message to the second PoC client.

9. A PoC system, comprising a PoC client and a PoC server, the PoC client and the PoC server having a user side hardware management module and a control side hardware management module respectively, wherein the control side hardware management module of the PoC client comprises:
a session management sub-module, adapted to determine whether to further query group member information when receiving an Ad hoc session request message; and
an information subscription and reception sub-module connected with the session management sub-module, adapted to send a request message of a group member information to the PoC server, when the group member information needs to be queried, wherein the session group member information is at least one of the following: an IP address, a user nickname, a uniform resource identifier or a phone number;
the control side management module of the PoC server comprises:
a session management sub-module, adapted to process initiation and release of an Ad hoc session as well as participation and quitting of a member in the session, and send session group member information to a second PoC client with a session request message; and
an information subscription and notification sub-module connected with the session management sub-module, adapted to support information subscription and information notification, and when determining to send the session group member information to the second PoC client according to an answer mode of the second PoC client and supplementary information of the session request message, send the session group member information to the second PoC client; and when determining not to send the session group member information to the second PoC client according to the answer mode of the second PoC client and supplementary information of the session request message, delete the session group member information, then send the session request message to the second PoC client.

10. The PoC system according to claim 9, wherein by interacting with the user, the session management sub-module of the PoC client determines whether to query the group member information; or according to configuration parameters, the session management sub-module determines whether to query the group member information.

* * * * *